United States Patent
Asao

[11] Patent Number: 6,157,111
[45] Date of Patent: Dec. 5, 2000

[54] ROTOR FOR DYNAMO-ELECTRIC MACHINE

[75] Inventor: Yoshihito Asao, Tokyo, Japan

[73] Assignee: Mitsubishi Denki Kabushiki Kaisha, Tokyo, Japan

[21] Appl. No.: 09/070,793

[22] Filed: May 1, 1998

[30] Foreign Application Priority Data

Nov. 13, 1997 [JP] Japan .................................. 9-312071

[51] Int. Cl.$^7$ .............................. H02K 1/00; H02K 1/22; H02K 1/27
[52] U.S. Cl. ............................................ 310/263; 310/181
[58] Field of Search .............................. 310/42, 156, 181, 310/263

[56] References Cited

U.S. PATENT DOCUMENTS

| | | | |
|---|---|---|---|
| 4,633,113 | 12/1986 | Patel ............................................ | 310/156 |
| 4,864,174 | 9/1989 | Kawamura et al. ..................... | 310/156 |
| 5,483,116 | 1/1996 | Kusase et al. ........................... | 310/263 |
| 5,663,605 | 9/1997 | Evans et al. ............................. | 310/181 |
| 5,753,989 | 5/1998 | Syverson et al. ....................... | 310/114 |
| 5,825,116 | 10/1998 | Ishikawa ................................. | 310/263 |
| 5,828,155 | 10/1998 | Adachi et al. ........................... | 310/263 |

FOREIGN PATENT DOCUMENTS

| | | |
|---|---|---|
| 3-139149 | 6/1991 | Japan . |
| 6-133478 | 5/1994 | Japan . |
| 7-123664 | 5/1995 | Japan . |

*Primary Examiner*—Elvin Enad
*Assistant Examiner*—Judson H. Jones
*Attorney, Agent, or Firm*—Sughrue, Mion, Zinn, Macpeak & Seas, PLLC

[57] ABSTRACT

A rotor for a dynamo-electric machine is capable of reducing core loss in a field core, and thus increasing the output efficiency. A rotor for a vehicular AC generator in accordance with the present invention is equipped with: a rotor coil through which current flows to generate magnetic flux; a field core which is provided such that it covers the rotor coil and which is composed of a first field core member and a second field core member having triangular magnetic poles, respectively; and an inter-magnetic-pole member which is provided between adjacent triangular magnetic poles and which has been magnetized in a direction so as to reduce the leakage of magnetic flux between the triangular magnetic poles and; wherein the triangular magnetic poles are constructed by laminating thin steel plates to reduce core loss.

8 Claims, 9 Drawing Sheets

ROTOR FOR DYNAMO-ELECTRIC MACHINE

BACKGROUND OF THE INVENTION

1. Field of the Invention

The present invention relates to a rotor for a dynamo-electric machine, the rotor being equipped with an inter-magnetic-pole member provided between adjacent triangular magnetic poles to reduce the leakage of magnetic flux between the triangular magnetic poles.

2. Description of Related Art

FIG. 11 is a sectional side elevation of a conventional vehicular AC generator; and FIG. 12 is a perspective view of a rotor shown in FIG. 11. The AC generator is equipped with: a case 3 comprised of a front bracket 1 and a rear bracket 2 made of aluminum; a shaft 6 which is provided in the case 3 and which has a pulley 4 fixed at one end thereof; a Lundell-type rotor 7 secured to the shaft 6; fans 5 secured to both side surfaces of the rotor 7; a stator 8 secured to the inner wall surface of the case 3; a slip ring 9 which is secured to the other end of the shaft 6 and which supplies current to the rotor 7; a pair of brushes 10 in sliding contact with the slip ring 9; a brush holder 11 which holds the brushes 10; a rectifier 12 which is electrically connected to the stator 8 to rectify alternating current generated in the stator 8 to direct current; a heat sink 17 fitted onto the brush holder 11; and a regulator 18 which is bonded to the heat sink 17 to adjust the magnitude of the AC voltage generated in the stator 8.

The rotor 7 is constituted by a rotor coil 13 through which current flows to generate magnetic flux, and a field core assembly 14 which is provided such that it covers the rotor coil 13 and in which magnetic poles are formed by the magnetic flux. The field core assembly 14 is composed of first field core member 21 and second field core member 22 which are alternately meshed. The first field core member 21 and the second field core member 22 are made of iron; the first field core member 21 has triangular magnetic poles 23, and the second field core member 22 has triangular magnetic poles 24. A hexahedral magnet 19 which has been magnetized in a direction so as to reduce the leakage of the magnetic flux between triangular magnetic poles 23 and 24 is secured at each pair of adjacent triangular magnetic poles 23 and 24.

The stator 8 is provided with a stator core 15, and a stator coil 16 which is composed of a conductor wound around the stator core 15 and in which alternating current is generated as the magnetic flux from the rotor coil 13 changes as the rotor 7 rotates.

In the vehicular AC generator configured as set forth above, current is supplied from a battery, not shown, to the rotor coil 13 via the brushes 10 and the slip ring 9 so as to generate magnetic flux; the triangular magnetic poles 23 of the first field core member 21 are magnetized to the N pole, while the triangular magnetic poles 24 of the second field core 22 are magnetized to the S pole. The pulley 4 is driven by an engine and the rotor 7 is rotated through the shaft 6, so that a rotary magnetic field is supplied to the stator coil 16, thus generating an electromotive force in the stator coil 16. This AC electromotive force is rectified into direct current through the rectifier 12 and the magnitude thereof is adjusted by the regulator 18 before it is supplied to the battery.

The majority of the magnetic flux generated in the rotor coil 13 enters the stator 8 through the triangular magnetic poles 23 of the first field core member 21 which have been magnetized to a N pole (positive polavity), travels through the stator 8 into the second field core member 22 through the triangular magnetic poles 24 which have been magnetized to a S pole (negative polavilty), and travels back into the stator 8 through the triangular magnetic poles 23 of the first field core member 21.

In the conventional vehicular AC generator rotor 7, the inter-magnetic-pole member 19 provided between the triangular magnetic poles 23 and 24 causes more magnetic flux that has been generated in the rotor coil 13 to pass through the field core 14. This means that more eddy current is accordingly generated in the field core assembly 14, posing the problem of increased core loss.

SUMMARY OF THE INVENTION

The present invention has been made with a view toward solving the above problem, and it is an object of the invention to provide a rotor for a dynamo-electric machine, which is capable of reducing core loss in a field core so as to permit higher output efficiency.

To this end, according to the present invention, there is provided a rotor for a dynamo-electric machine, which the rotor being constructed by: a rotor coil through which current flows to generate magnetic flux; a field core assembly which is provided such that it covers said rotor coil and which is composed of a first field core member and a second field core member which respectively have triangular magnetic poles alternately meshed with each other; and an inter-magnetic-pole member which is provided between adjacent ones of the triangular magnetic poles and which has been magnetized in a direction so as to reduce the leakage of magnetic flux between said triangular magnetic poles; wherein the triangular magnetic pole is constructed by laminating thin steel plates to reduce core loss.

In another aspect of the present invention, there is provided a rotor for a dynamo-electric machine, which the rotor being constructed by: a rotor coil through which current flows to generate magnetic flux; a field core assembly which is provided such that it covers the rotor coil and which is composed of a first field core member and a second field core member which respectively have triangular magnetic poles alternately meshed with each other; and an inter-magnetic-pole member which is provided between adjacent ones of the triangular magnetic poles and which has been magnetized in a direction so as to reduce the leakage of magnetic flux between said triangular magnetic poles; wherein the triangular magnetic poles are provided with irregular sections to reduce core loss.

In yet another aspect of the present invention, there is provided a rotor for a dynamo-electric machine, which the rotor being constructed by: a rotor coil through which current flows to generate magnetic flux; an annular magnetic pole assembly which is provided such that it covers the rotor coil and which is constituted by joining a first triangular magnetic pole and a second triangular magnetic pole which are alternately meshed with each other and which are formed by laminating thin steel plates, and an inter-magnetic-pole member which is provided between adjacent first and second triangular magnetic poles and which has been magnetized in a direction so as to reduce the leakage of magnetic flux between the triangular magnetic poles; and a first field base and a second field base secured to both end surfaces of the magnetic pole assembly.

In a preferred form of the rotor for a dynamo-electric machine, the inter-magnetic-pole member is constituted by a magnetic portion composed of a magnetic material and a nonmagnetic portion which covers the magnetic portion.

In another preferred form of the rotor for a dynamo-electric machine, the outer peripheral surface of the inter-magnetic-pole member is provided with a locking portion for preventing the triangular magnetic poles from shifting radially outward.

In yet another preferred form of the rotor for a dynamo-electric machine, the outer peripheral surface thereof is provided with a nonmagnetic member for preventing the inter-magnetic-pole member and the triangular magnetic poles from shifting radially outward.

DESCRIPTION OF THE PREFERRED EMBODIMENTS

Figure 11:
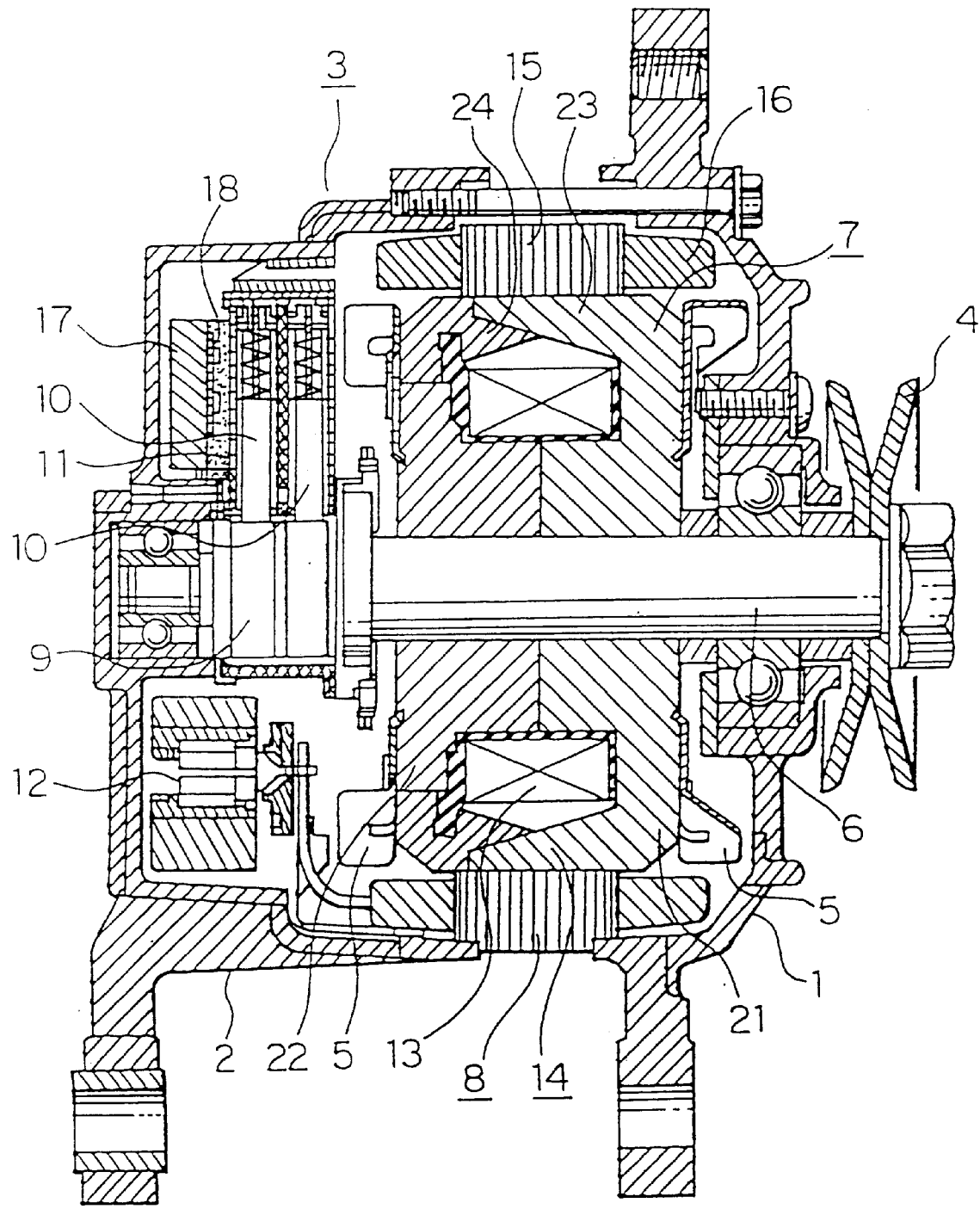
FIG. 11 is a sectional view showing a conventional vehicular AC generator.
Figure 12:
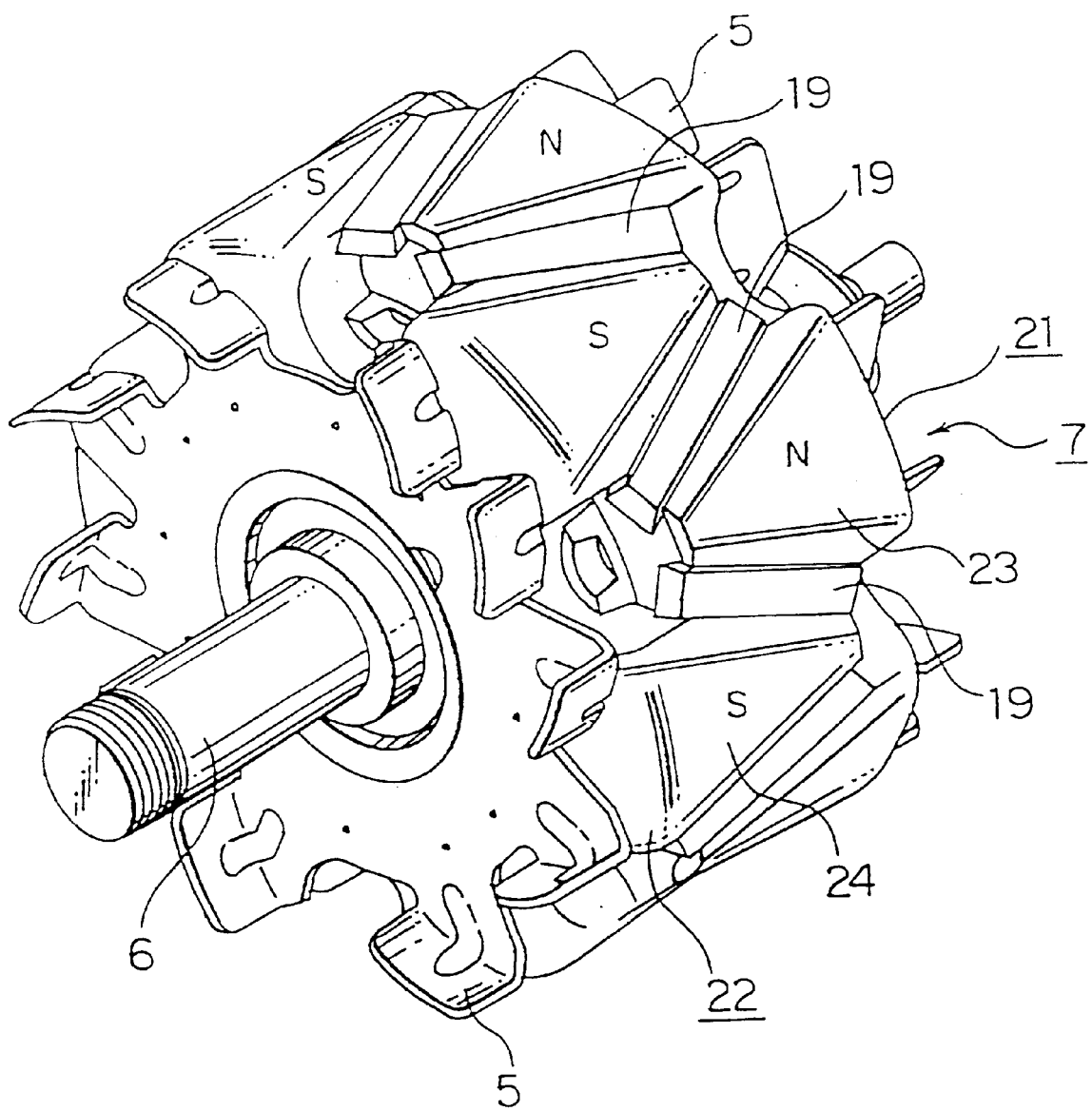
FIG. 12 is a perspective view illustrating the rotor shown in FIG. 11.

The rotor of a vehicular AC generator in accordance with the present invention will now be explained; parts that are similar or correspond to those shown in FIG. 11 and FIG. 12 will be assigned like reference numerals.

First Embodiment

Figure 1:
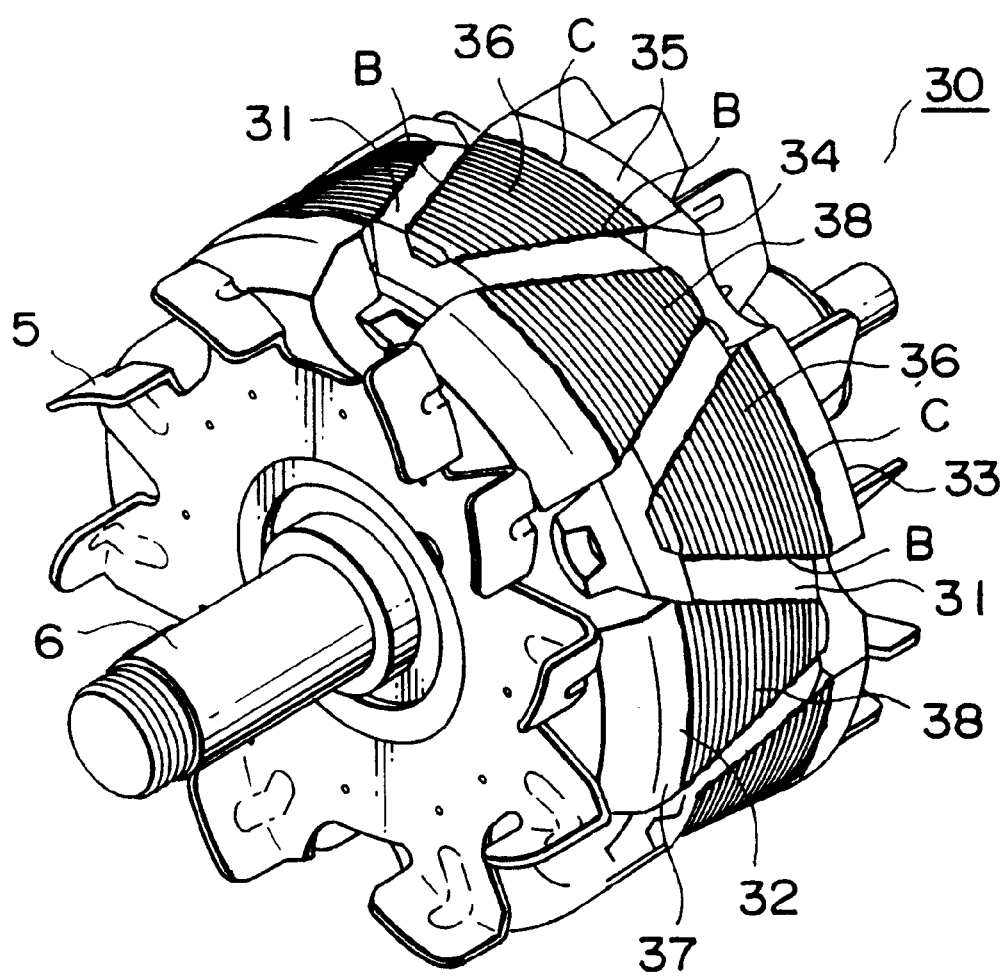
FIG. 1 is a perspective view of a rotor of a vehicular AC generator of a first embodiment in accordance with the present invention.
Figure 2:
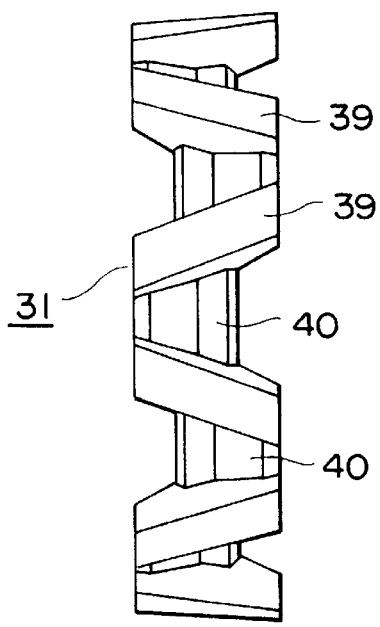
FIG. 2 is a side view of an inter-magnetic-pole member shown in FIG. 1.
Figure 3:
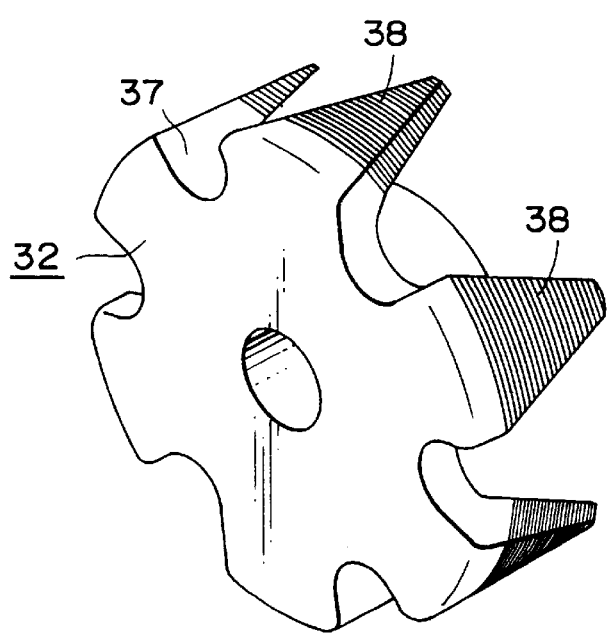
FIG. 3 is a perspective view of a second field core member shown in FIG. 1.
Figure 4:
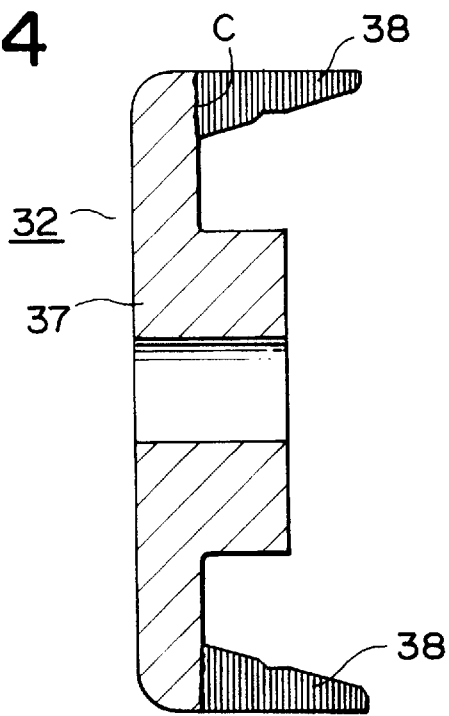
FIG. 4 is a side view of the second field core member shown in FIG. 1

FIG. 1 is a perspective view of a rotor 30 of a vehicular AC generator in accordance with the present invention; FIG. 2 is a side view of an inter-magnetic-pole member 31 installed in the rotor 30 shown in FIG. 1; FIG. 3 is a perspective view of a second field core member 32 installed on the rotor shown in FIG. 1; and FIG. 4 is a side sectional view of the second field core member 32 shown in FIG. 3.

The rotor 30 is provided with a rotor coil 13 through which current flows to generate magnetic flux, a field core 33 which is provided such that it covers the rotor coil 13 and in which magnetic poles are formed by magnetic flux, and an inter-magnetic-pole member 31 which is provided on the field core 33 such that it is formed in a zigzag fashion around the field core.

The field core 33 has a paired structure composed of a first field core member 34 and a second field core member 32 which are alternately meshed with each other. The first field core member 34 has a first field base 35 and first triangular magnetic poles 36 magnetized to the N pole which are composed by laminating thin steel plates of approximately 0.8 mm thick on the first field base 35 in the axial direction of the rotor 30. The second field core member 32 has a second field base 37 and second triangular magnetic poles 38 magnetized to the S pole which are composed by laminating thin steel plates of approximately 0.8 mm thick on the second field base 37 in the axial direction of the rotor 30. The triangular magnetic poles 36 and 38 are both welded at edges B to join the steel plates, and root portions C thereof are welded to join them to the field bases 35 and 37, respectively.

The inter-magnetic-pole member 31 is secured between the adjacent triangular magnetic poles 36 and 38 and it is magnetized so as to reduce the leakage of the magnetic flux between the triangular magnetic poles 36 and 38. More specifically, the inter-magnetic-pole member 31 is secured so that the side opposed to the triangular magnetic pole 36 magnetized to the N pole constitutes the N-pole surface of the inter-magnetic-pole member 31, while the side opposed to the triangular magnetic pole 38 magnetized to the S pole constitutes the S-pole surface of the inter-magnetic-pole member 31. This makes it possible to reduce ineffective magnetic flux which leaks between adjacent triangular magnetic poles 36 and 38 and does not contribute to the power generation of an AC generator, thus achieving higher power generating efficiency of the AC generator. The inter-magnetic-pole member 31 has magnetic portions 39 formed on the outer periphery thereof and nonmagnetic portions 40 which are formed on the inner periphery thereof and which connect adjacent magnetic portions 39.

The magnetic portions 39 are fabricated by forming a bracelet of zigzaging resinous members by injection molding using a magnetic resin composed of a polyamide-based resin to which ferrite-based iron filings have been added, then applying magnetic field to only the outer peripheral side of the resinous members. The portions that are left unmagnetized provide the nonmagnetic portions 40.

The stator 8 is provided with a stator core 15, and a stator coil 16, composed of a conductor wound around the stator core 15 and in which alternating current is generated as the magnetic flux from the rotor coil 13 changes as the rotor 30 rotates.

The operation of the vehicular AC generator configured as set forth above will now be explained. Current is supplied from a battery, not shown, to the rotor coil 13 via the brushes 10 and the slip ring 9 so as to generate magnetic flux; the N magnetic poles are formed on the triangular magnetic pole 36 of the first field core member 34, while the S magnetic poles are formed on the triangular magnetic poles 38 of the second field core member 32. The pulley 4 is driven by an engine and the rotor 30 is rotated through the shaft 6, so that a rotary magnetic field is imparted to the stator coil 16, thus generating an electromotive force in the stator coil 16. This AC electromotive force is rectified into direct current through the rectifier 12 and the magnitude thereof is adjusted by the regulator 18 before it is supplied to the battery.

The majority of the magnetic flux generated in the rotor coil 13 enters the stator 8 through the triangular magnetic poles 36 of the first field core member 34 which have been magnetized to the N pole, travels through the stator 8 into the second field core member 32 through the triangular magnetic poles 38 which have been magnetized to the S pole, and travels back into the stator 8 through the triangular magnetic poles 36 of the first field core member 34, thus forming a so-called closed circuit. The majority of magnetic flux generated in the rotor coil 13 passes through the field core 33, but the triangular magnetic poles 36 and 38 composed of laminated thin steel plates are capable of controlling the generation of eddy current at the field core 33. This leads to lower core loss and results in higher power generating efficiency.

Furthermore, the inter-magnetic-pole member 31 employs a magnetic resin that can be easily molded or processed rather than using a fragile oxide magnet or a compound magnet. Thus, the inter-magnetic-pole 31 can be easily formed.

Second Embodiment

Figure 5:
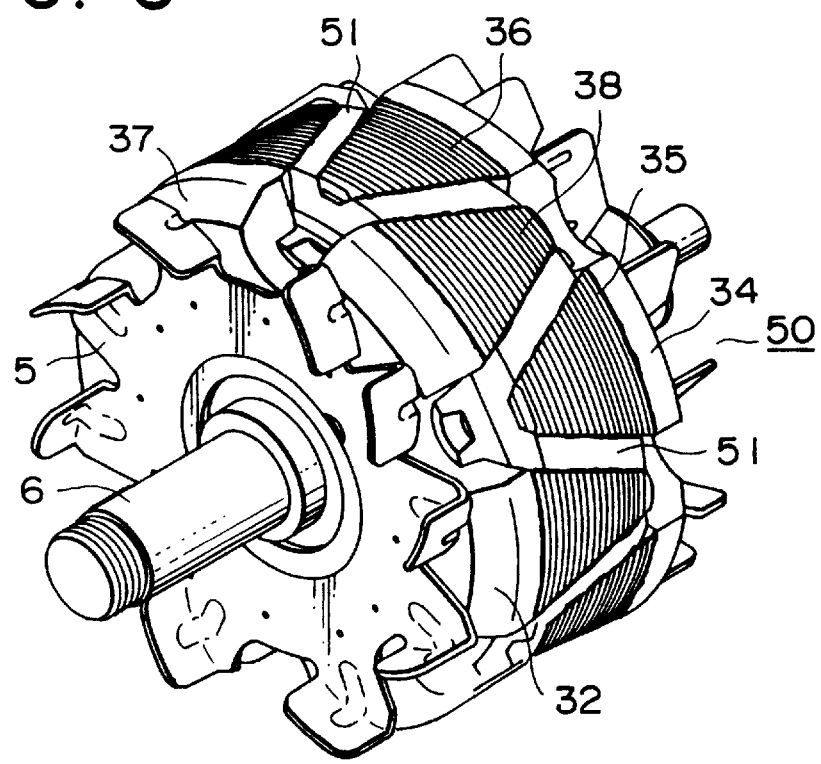
FIG. 5 is a perspective view of a rotor of a vehicular AC generator of a second embodiment in accordance with the present invention.
Figure 6:
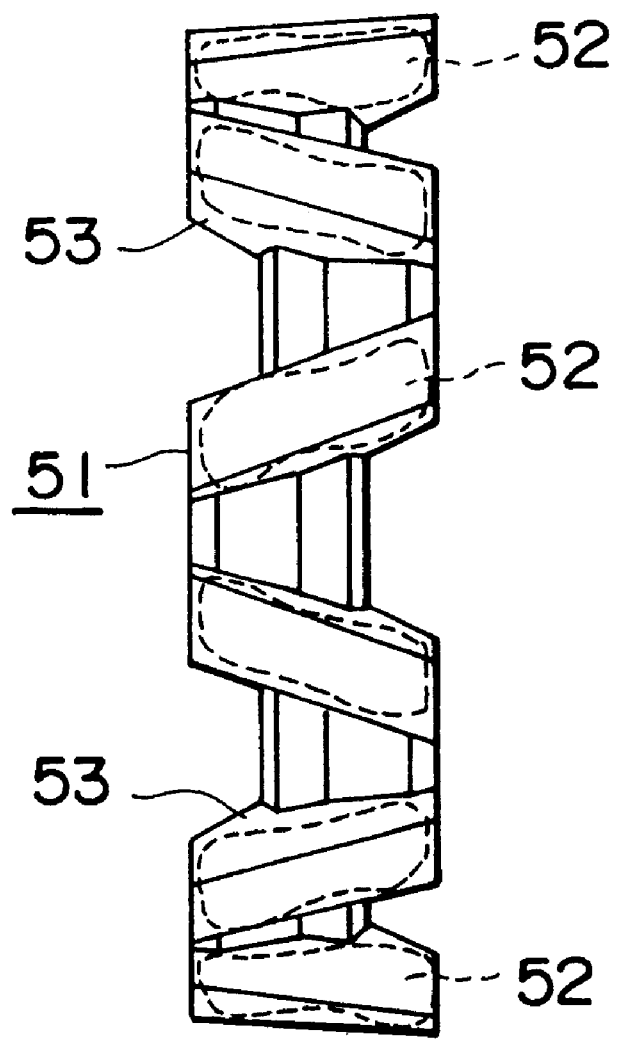
FIG. 6 is a side view of an inter-magnetic-pole member shown in FIG. 5.

FIG. 5 is a perspective view of a rotor 50 of a vehicular AC generator in accordance with the present invention; and FIG. 6 is a side view of an inter-magnetic-pole member 51 installed on the rotor 50 shown in FIG. 5.

The inter-magnetic-pole member 51 is different from that of the first embodiment in that it is constituted by magnetic portions 52 composed of a magnetic material made of a magnetic resin which employs a polyamide-based resin with ferrite-based iron filings mixed therein and which has been magnetized, and nonmagnetic portions 53 composed of a polyamide-based resin which cover the magnetic portions 52

In the second embodiment, the magnetic resin is used to carry out injection molding to form the resin components which are then magnetized to form the magnetic portions 52. Then, the magnetic portions 52 sre disposed in a mold and the polyamide-based resin is injection molded to form the inter-magnetic-pole member 51 wherein the magnetic portions 52 are covered with the nonmagnetic portions 53.

In the first embodiment, the magnetic resin, which is a costly material, is used for the entire inter-magnetic-pole member 51; in the second embodiment, the magnetic resin is used only for the magnetic portions 52, which permits the manufacturing cost of the rotor coil to be lowered.

An oxide magnet or a compound magnet may be employed in place of the magnetic resin for the magnetic portions 52. Likewise, a nonmagnetic metal may alternatively be employed for the nonmagnetic portions 53.

Third Embodiment

Figure 7:
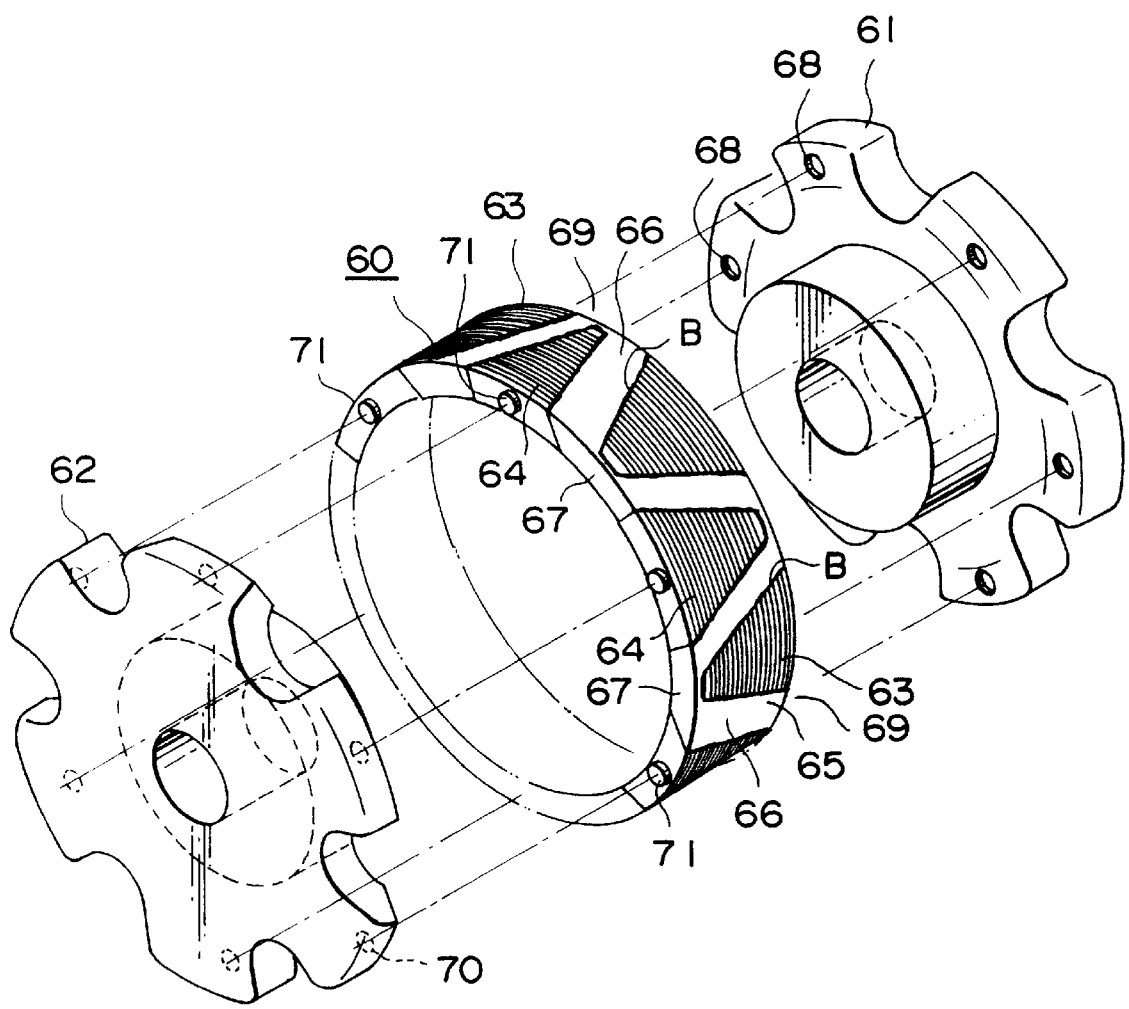
FIG. 7 is an exploded perspective view illustrating an essential portion of a rotor of a vehicular AC generator of a third embodiment in accordance with the present invention.

FIG. 7 is an exploded perspective view showing a magnetic pole member 60, a first field base 61, and a second field base 62 incorporated in the rotor of a vehicular AC generator in accordance with a third embodiment.

The rotor is equipped with the rotor coil 13, the magnetic pole member 60 is provided such that it covers the rotor coil 13, and the first field base 61 and the second field base 62 respectively secured to both end surfaces of the magnetic pole member 60.

The magnetic pole assembly 60 is provided with: first triangular magnetic poles 63 magnetized to the N pole which are formed by laminating thin steel plates approximately 0.8 mm thick in the axial direction of the rotor; second triangular magnetic poles 64 magnetized to the S pole which are formed by laminating thin steel plates approximately 0.8 mm thick in the axial direction of the rotor; and an inter-magnetic-pole member 65 secured between the first triangular magnetic poles 63 and the second triangular magnetic poles 64.

The inter-magnetic-pole member 65 is secured in a direction so as to reduce the leakage of magnetic flux between the triangular magnetic poles 63 and 64, and is formed as a bracelet with a zigzag shape. The inter-magnetic-pole member 65 employs the same magnetic resin as the inter-magnetic-pole member 31 in the first embodiment,and has magnetic portions 66 formed on the outer periphery thereof and nonmagnetic portions 67, which join the adjacent magnetic portions 66, formed on the inner periphery thereof.

Protuberances 69 that engage with recessed sections 68 of the first field base 61 are formed on one end surface of the magnetic pole assembly 60, and protuberances 71 that engage with recessed sections 70 of the second field base 62 are formed on the other end surface of the magnetic pole assembly 60.

With regard to the magnetic pole assembly 60, the first triangular magnetic poles 63 and the second triangular magnetic poles 64 are formed in advance by laminating steel plates and welding the edges B to join the steel plates. The triangular magnetic poles 63 and 64 are then placed in a metal mold and a magnetic resin is injection molded in the metal mold so as to form the triangular magnetic poles 63, 64, and the inter-magnetic-pole member 65 as one piece.

Although the triangular magnetic poles 36 and 38 in the first and second embodiments require the time to weld the edges to firmly join the laminated steel plates, in the third embodiment, the steel plates only need to be joined by welding temporarily because the steel plates are firmly joined with the resin during the injection molding. This reduces the time and effort required for the cumbersome work of welding. The rotor can be easily manufactured by first placing the rotor coil 13 in the annular magnetic pole assembly 60, and then welding both ends of the magnetic pole assembly 60 to the first field base 61 and the second field base 62, respectively. A molding resin is used as the material for the inter-magnetic-pole member 65, but the material may alternatively be a metal molding material or a sintered material.

Fourth Embodiment

Figure 8:
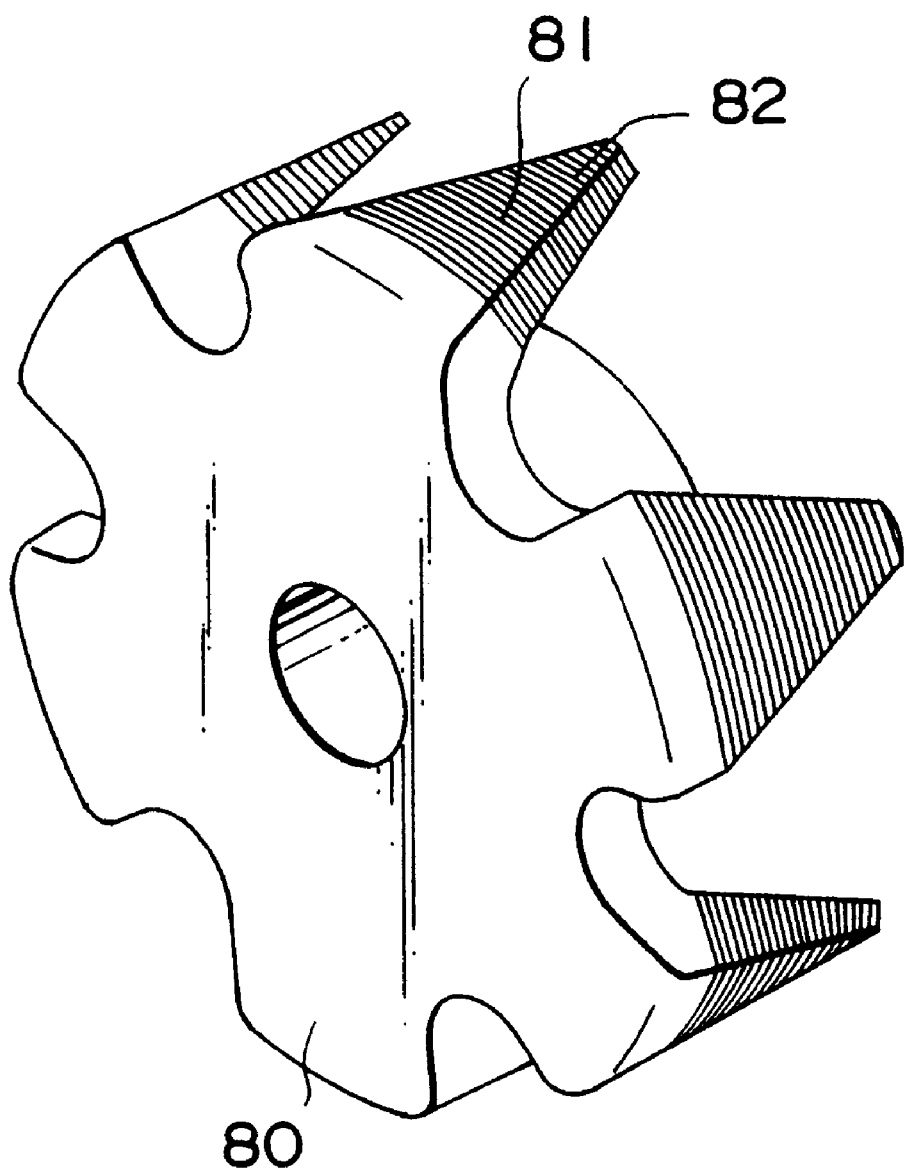
FIG. 8 is a perspective view of a second field core member of a rotor of a vehicular AC generator of a fourth embodiment in accordance with the present invention.

FIG. 8 is a perspective view of a second field core member 80 of the rotor of a vehicular AC generator in accordance with the present invention. The fourth embodiment differs from the first embodiment in that the surfaces of triangular magnetic poles 81 of the second field core member 80 are made of iron and the surfaces of the triangular magnetic poles of the first field core member are provided with slits 82 which extend in the circumferential direction and form irregular sections.

In the fourth embodiment, core loss can be reduced and the power generating efficiency of an AC generator can be thereby improved simply by forming the slits on the conventional triangular magnetic poles 23 and 24. The irregular sections are not limited to slits; alternatively, a plurality of protuberances may be formed on the surfaces of the triangular magnetic poles 23 and 24. The inter-magnetic-pole member 65 in this embodiment is made of a molding resin, but may alternatively be made of a metal molding material or a sintered material.

Fifth Embodiment

Figure 9:
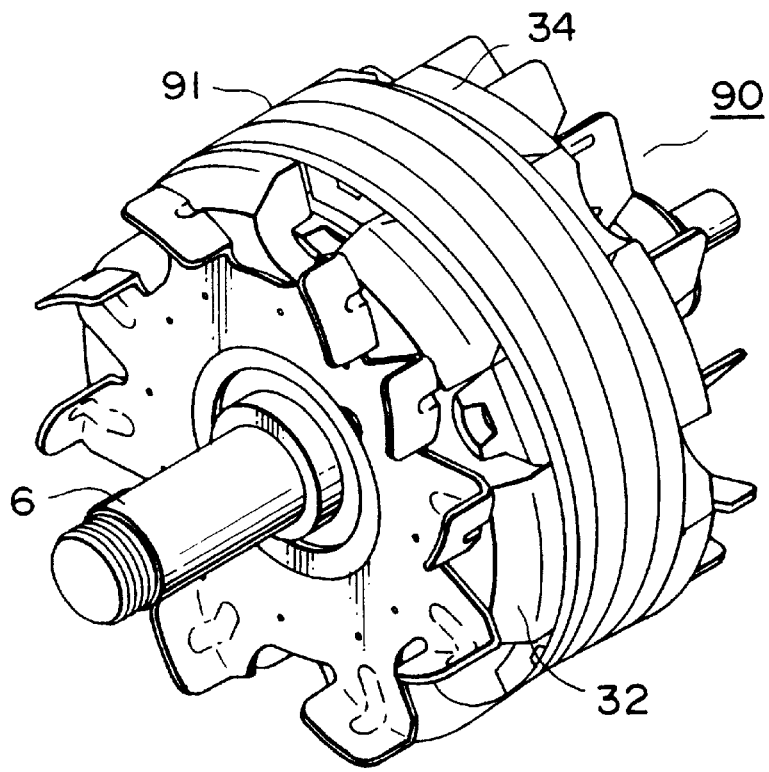
FIG. 9 is a perspective view of a rotor of a vehicular AC generator of a fifth embodiment in accordance with the present invention.

FIG. 9 is a perspective view illustrating a rotor 90 of a vehicular AC generator in accordance with the present invention. The outer periphery of the rotor 90 of the fifth embodiment is wrapped with a nonmagnetic tape 91 employing carbon fiber as the base material thereof and impregnated with resin. This makes it possible to reliably prevent the inter-magnetic-pole member 31 and the triangular magnetic poles 36 and 38 from moving radially outward when the rotor 90 rotates, thus leading to improved resistance to centrifugal force.

A plurality of rings made of a nonmagnetic metal may be also used in place of the tape.

Sixth Embodiment

Figure 10:
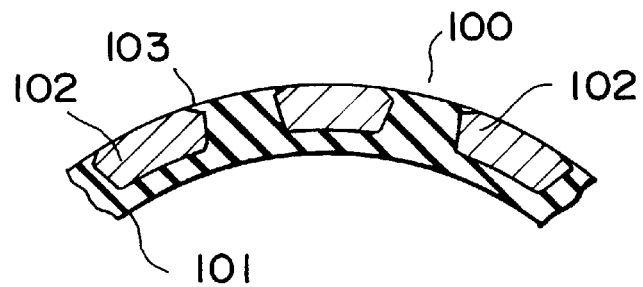
FIG. 10 is a sectional view of an essential portion of a rotor of a vehicular AC generator of a sixth embodiment in accordance with the present invention.

FIG. 10 is an enlarged sectional view showing an essential portion of a rotor 100 of a vehicular AC generator in accordance with the present invention. In the sixth embodiment, the outer periphery of an inter-magnetic-pole member 101 is provided with tapered locking portions 103 which prevent first and second triangular magnetic poles 102 from moving radially outward when the rotor 100 rotates.

Although the embodiments have been explained referring to the vehicular AC generator as the rotor for a dynamo-electric machine, the present invention can also obviously be applied, for example, to the rotor for an electric motor.

Thus, the rotor for a dynamo-electric machine in according with the present invention is equipped with: a rotor coil through which current flows to generate magnetic flux; a field core assembly which is provided such that it covers the rotor coil and which is composed of a first field core member and a second field core member which respectively have triangular magnetic poles alternately meshed with each other; and an inter-magnetic-pole member which is provided between adjacent ones of the triangular magnetic poles and which has been magnetized in a direction so as to reduce the leakage of magnetic flux between the triangular magnetic poles; wherein the triangular magnetic pole is constructed by laminating thin steel plates to reduce core loss. Therefore, the triangular magnetic pole reduces core loss in a field core, despite the larger magnetic flux passing through the field core by the inter-magnetic-pole member, and permits a higher output efficiency of the dynamo-electric machine.

Also, the rotor for a dynamo-electric machine in according with the present invention is equipped with: a rotor coil through which current flows to generate magnetic flux; a field core assembly which is provided such that it covers the rotor coil and which is composed of a first field core member and a second field core member which respectively have triangular magnetic poles alternately meshed with each other; and an inter-magnetic-pole member which is provided between adjacent ones of the triangular magnetic poles and which has been magnetized in a direction so as to reduce the leakage of magnetic flux between the triangular magnetic poles; wherein the triangular magnetic poles are provided with irregular sections to reduce core loss. Therefore, the triangular magnetic pole reduces core loss in a field core, despite the larger magnetic flux passing through the field core by the inter-magnetic-pole member, permits a higher output efficiency of the dynamo-electric machine.

Furthermore, the rotor for a dynamo-electric machine in according with the present invention is equipped with: a rotor coil through which current flows to generate magnetic flux; an annular magnetic pole assembly which is provided such that it covers said rotor coil and which is constituted by joining a first triangular magnetic pole and a second triangular magnetic pole which are alternately meshed with each other and which are formed by laminating thin steel plates, and an inter-magnetic-pole member which is provided between adjacent first and second triangular magnetic poles and which has been magnetized in a direction so as to reduce the leakage of magnetic flux between said triangular magnetic poles; and a first field base and a second field base secured to both end surfaces of said magnetic pole assembly. Therefore, the steel plates are joined with the inter-magnetic-pole members, making it possible to eliminate the cumbersome work of joining the steel sheets by welding to form the triangular magnetic poles. The rotor can be easily manufactured by first placing a rotor coil in a magnetic pole assembly, and then by joining both ends of the magnetic pole assembly to a first field base and a second field base, respectively.

Moreover, in the rotor for a dynamo-electric machine according to the present invention, the inter-magnetic-pole member is constituted by a magnetic portion composed of a magnetic material and a nonmagnetic portion which covers the magnetic portion, so that the manufacturing cost of rotors can be reduced by using a costly magnetic component for only a limited portion of the inter-magnetic-pole member.

Further, in the rotor for a dynamo-electric machine according to the present invention, the outer peripheral surface of the inter-magnetic-pole member is provided with a locking portion for preventing the triangular magnetic poles from shifting radially outward, so that the angular magnetic pole is prevented from shifting radially outward when the rotor rotates, thus improving resistance to centrifugal force.

Furthermore, in the rotor for a dynamo-electric machine according to the present invention, the outer peripheral surface of the inter-magnetic-pole member and the triangular magnetic poles is provided with a nonmagnetic member for preventing the inter-magnetic-pole member and the triangular magnetic poles from shifting radially outward, so that the inter-magnetic-pole member and the angular magnetic poles are prevented from shifting radially outward when the rotor rotates, thus achieving improving resistance to centrifugal force.

What is claimed is:

1. A rotor for a dynamo-electric machine, said rotor comprising:
   a rotor coil through which current flows to generate magnetic flux;
   a field core assembly which covers said rotor coil and which is composed of a first field core member and a second field core member which respectively have triangular magnetic poles alternately meshed with each other; and
   an inter-magnetic-pole member provided between adjacent ones of said triangular magnetic poles and which has been magnetized in a direction so as to reduce the leakage of magnetic flux between said triangular magnetic poles;
   wherein said triangular magnetic pole is constructed by laminating thin steel plates to reduce core loss; and
   wherein said inter-magnetic-pole member (51) comprises a plurality of zig-zag oriented magnetic portions (52) composed of a magnetic material and surrounded by a molded resin nonmagnetic material (53) which covers said magnetic portions and interconnects them in a circular configuration.

2. A rotor for a dynamo-electric machine according to claim 1, wherein said inter-magnetic-pole member is integrally constructed, and axial ends of sad inter-magnetic-pole member corresponding to axial ends of said triangular magnetic poles have a reduced thickness.

3. A rotor for a dynamo-electric machine, said rotor comprising:

a rotor coil through which current flows to generate magnetic flux;

a field core assembly which is provided such that it covers said rotor coil and which is composed of a first field core member and a second field core member which respectively have triangular magnetic poles alternately meshed with each other; and an inter-magnetic-pole member which is provided between adjacent ones of said triangular magnetic poles and which has been magnetized in a direction so as to reduce the leakage of magnetic flux between said triangular magnetic poles;

wherein said triangular magnetic poles are provided with a plurality of circumferentially oriented slits to reduce core loss.

4. A rotor for a dynamo-electric machine, said rotor comprising:

a rotor coil through which current flows to generate magnetic flux;

an annular magnetic pole assembly which is provided such that it covers said rotor coil and which is constituted by joining a first triangular magnetic pole and a second triangular magnetic pole which are alternately meshed with each other and which are formed by laminating thin steel plates, and an inter-magnetic-pole member which is provided between adjacent first and second triangular magnetic poles and which has been magnetized in a direction so as to reduce the leakage of magnetic flux between said triangular magnetic poles; and a first field base and a second field base secured to both end surfaces of said magnetic pole assembly.

5. A rotor for a dynamo-electric machine, said rotor comprising:

a rotor coil through which current flows to generate magnetic flux;

a field core assembly which covers said rotor coil and which is composed of a first field core member and a second field core member which respectively have triangular magnetic poles alternately meshed with each other; and an inter-magnetic-pole member provided between adjacent ones of said triangular magnetic poles and which has been magnetized in a direction so as to reduce the leakage of magnetic flux between said triangular magnetic poles;

wherein said triangular magnetic pole is constructed by laminating thin steel plates to reduce core loss; and wherein the outer peripheral surface of the inter-magnetic-pole member is provided with tapered locking portions overlying adjacent outer edges of the poles for preventing the triangular magnetic poles from shifting radially outward.

6. A rotor for a dynamo-electric machine, said rotor comprising:

a rotor coil through which current flows to generate magnetic flux;

a field core assembly which is provided such that it covers said rotor coil and which is composed of a first field core member and a second field core member which respectively have triangular magnetic poles alternately meshed with each other; and an inter-magnetic-pole member which is provided between adjacent ones of said triangular magnetic poles and which has been magnetized in a direction so as to reduce the leakage of magnetic flux between said triangular magnetic poles;

wherein said triangular magnetic poles are constructed by laminating thin steel plates to reduce core loss; and wherein the outer peripheral surface of the rotor is provided with a nonmagnetic member in the form of a resin impregnated carbon fiber tape wrapped around the rotor for preventing the inter-magnetic-pole member and the triangular magnetic poles from shifting radially outward.

7. A rotor for a dynamo-electric machine according to claim 6, wherein said inter-magnetic-pole member (51) comprises a plurality of zig-zag oriented magnetic portions (52) composed of a magnetic material and surrounded by a molded resin nonmagnetic material (53) which covers said magnetic portions and interconnects them in a circular configuration.

8. A rotor for a dynamo-electric machine according to claim 6, wherein the carbon fiber tape is spirally wrapped.

* * * * *